United States Patent
Allo

(10) Patent No.: US 10,983,943 B2
(45) Date of Patent: Apr. 20, 2021

(54) DATA STORAGE SYSTEM WITH SUPPLEMENTAL PROCESSING BUS

(71) Applicant: Seagate Technology LLC, Cupertino, CA (US)

(72) Inventor: Christopher Nicholas Allo, Longmont, CO (US)

(73) Assignee: Seagate Technology LLC, Fremont, CA (US)

(*) Notice: Subject to any disclaimer, the term of this patent is extended or adjusted under 35 U.S.C. 154(b) by 347 days.

(21) Appl. No.: 16/193,091

(22) Filed: Nov. 16, 2018

(65) Prior Publication Data

US 2020/0159682 A1 May 21, 2020

(51) Int. Cl.
| | |
|---|---|
| *G06F 13/40* | (2006.01) |
| *G06F 13/16* | (2006.01) |
| *G11B 33/12* | (2006.01) |
| *G06F 21/85* | (2013.01) |
| *G06F 21/80* | (2013.01) |

(52) U.S. Cl.
CPC ...... *G06F 13/4068* (2013.01); *G06F 13/1668* (2013.01); *G06F 21/80* (2013.01); *G06F 21/85* (2013.01); *G11B 33/122* (2013.01)

(58) Field of Classification Search
CPC .. G06F 13/4068; G06F 13/1668; G06F 21/80; G06F 21/85; G11B 33/122
USPC .......................................................... 726/1
See application file for complete search history.

(56) References Cited

U.S. PATENT DOCUMENTS

| | | | |
|---|---|---|---|
| 5,812,821 A * | 9/1998 | Sugi ...................... | G06F 3/0601 703/25 |
| 7,155,604 B2 | 12/2006 | Kawai | |
| 9,805,186 B2 * | 10/2017 | Pohm ...................... | G06F 21/44 |
| 2005/0097263 A1 | 5/2005 | Wurzburg | |
| 2007/0136501 A1 | 6/2007 | Chang et al. | |
| 2007/0220202 A1 | 9/2007 | Sutardja et al. | |
| 2012/0278354 A1 | 11/2012 | Yan et al. | |
| 2015/0362965 A1 | 12/2015 | Davis et al. | |
| 2016/0196154 A1 * | 7/2016 | Sarukhanov ............ | H04W 4/80 713/2 |
| 2019/0042501 A1 * | 2/2019 | Trika ...................... | G06F 12/10 |
| 2020/0117520 A1 * | 4/2020 | Costa ..................... | G06F 3/0604 |

* cited by examiner

*Primary Examiner* — Michael S McNally
(74) *Attorney, Agent, or Firm* — Hall Estill Attorneys at Law

(57) ABSTRACT

A data storage system can employ at least one data storage device having a supplemental processing bus that connects a first controller to a second controller with the supplemental bus being exposed to an exterior surface of a housing. The second controller may be positioned on a portable computing component connected to the supplemental bus while the portable computing component is positioned external to the housing. The computing capabilities of the portable computing component are identified with the first controller to allow a supplementation strategy to be generated with the first controller in response to connection of the portable computing component to the supplemental bus. The supplementation strategy can then be executed by assigning at least one processing task from the first controller to the second controller.

19 Claims, 5 Drawing Sheets

DATA STORAGE SYSTEM WITH SUPPLEMENTAL PROCESSING BUS

SUMMARY

In some embodiments, a data storage system has a first controller connected to a first bus with the first bus being accessible from a position external to a housing where the first controller is resident. A first computing component consisting of a second controller is electrically connected to the first bus and positioned external to the housing. The first controller is configured to generate a supplementation strategy in response to connection of the first computing component with the first bus with the supplementation strategy assigning at least one processing task from the first controller to the second controller while the first computing component is attached to the first bus.

A data storage system, in accordance with other embodiments, has a supplemental processing bus connecting a first controller to a second controller with the supplemental bus being exposed to an exterior surface of a housing. The second controller is positioned on a portable computing component connected to the supplemental bus while the portable computing component is positioned external to the housing. The computing capabilities of the portable computing component are identified with the first controller to allow a supplementation strategy to be generated with the first controller in response to connection of the portable computing component to the supplemental bus. The supplementation strategy is then executed by assigning at least one processing task from the first controller to the second controller.

Various embodiments of a data storage system A data storage system can employ at least one data storage device having a supplemental processing bus that connects a first controller to a second controller with the supplemental bus being exposed to an exterior surface of a housing. The second controller may be positioned on a portable computing component connected to the supplemental bus while the portable computing component is positioned external to the housing. The computing capabilities of the portable computing component are identified with the first controller to allow a supplementation strategy to be generated with the first controller in response to connection of the portable computing component to the supplemental bus. The supplementation strategy is then executed by assigning at least one processing task from the first controller to the second controller. The first controller generates a security strategy in response to the portable computing component having a security module and subsequently executes the security strategy with the second controller and security module to secure data stored in memory resident in the housing.

DETAILED DESCRIPTION

Various embodiments of this disclosure are generally directed to a data storage system employing an externally connected processor to supplement an internal processor and provide optimal data storage performance.

The progression of computing capabilities along with the reduction in the physical size of computing components have expanded computing systems, such as data storage networks. Such expansion has introduced a number of physically separate components acting together to provide greater computing power than a single computing device. However, the connections between separate computing components can be susceptible to unwanted third-party activity that jeopardizes the integrity of stored data. In addition, decentralized computing systems can suffer from minimal modularity that inhibit efficient supplementation of computing capabilities.

With these issues in mind, a data storage device is configured, in some embodiments, with increased modularity and security via connection of a processing component to an external bus. The externally connected processing component can be utilized to secure the data, firmware, and hardware of a data storage system by providing unique security information, such as keys, passwords, and/or values. The ability to selectively insert a processing component into a data storage device allows for increased processing capabilities without reconfiguring portions of a data storage system, which can be inefficient and introduce data security issues.

Figure 1:
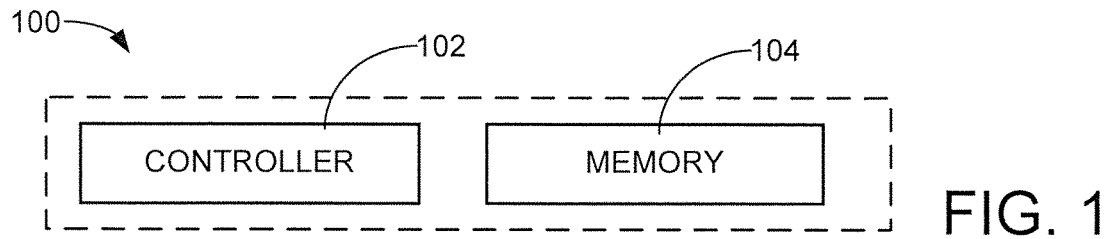
FIG. 1 depicts a block representation of an example data storage device in which various embodiments may be practiced.

Turning to the drawings, a block representation of an example data storage device 100 in which various embodiments can be practiced is shown FIG. 1. The data storage device 100 incorporates a controller 102 and a memory 104 to provide computing capabilities, such as data capacity, data transfer, data storage, communication with other computing components, and device security operations. The controller 102 may have one or more hardware and/or programmable processing circuits that execute programming instructions (e.g., firmware) in a local processor memory to provide top level control functions for the device. The memory 104 may be configured as non-volatile memory (NVM) for the storage of user data from a host device. The utilization of the controller 102 and memory 104 allows the data storage device 100 to store and retrieve data in a fast and efficient manner.

Some data storage devices, such as hard disc drives (HDDs), store data in memory 104 that employs rotatable data recording media. Such media may take the form of one or more magnetic recording discs which are accessed using a corresponding array of data transducers (heads). Such transducers incorporate sliders with air bearing surfaces that aerodynamically support the sliders in close proximity to the media surfaces by fluidic currents of the surrounding atmosphere established by high speed rotation of the media.

One or more write elements can be supported by the sliders to magnetically write data in the form of alternating magnetic patterns to tracks defined on the media surfaces. Read sensors supported by the sliders are used to sense the magnetic patterns and recover the previously stored data. Other active and passive elements can be incorporated into the sliders such as a head assisted magnetic recording (HAMR) system, a fly height adjustment mechanism, a contact sensor, etc.

Other forms of data storage devices such as solid-state drives (SSDs) use solid-state semiconductor memory to provide non-volatile memory storage. The memory 104 may be erasable memory such as NAND or NOR flash, or may be rewritable-in-place memory such as STRAM, RRAM, PCRAM, etc. Solid-state memory tends to provide significantly faster data input/output (I/O) transfer rates as compared to rotatable media, since the solid-state memory does not involve the latencies normally associated with moving the transducer to a target track and waiting for the disc to rotate past the transducer. At the same time, solid-state memory tends to be more expensive than rotatable media, and may have other performance related issues as well such as limited program/erase (PE) count service life, etc.

So-called hybrid devices use multiple different forms of non-volatile memory to store user data for a host device. Some hybrid devices combine the rotatable media of a hard disc drive (HDD) with the flash memory of a solid-state drive (SSD) to provide a hybrid solid-state drive (HSSD). An HSSD utilizes the rotatable media for long term storage of user data, and promotes (pins) certain data sets to the faster flash memory to achieve higher data transfer rate performance. While operable, the continued demand for ever faster data transfer throughput performance presents a need for further improvements in the manner in which hybrid devices are managed, particularly in mass storage (multi-device) environments.

As explained below, a data storage device includes a top level (primary) controller configured to store data to a main non-volatile memory (NVM), and a front end controller configured to store data to a secondary NVM. The secondary NVM has a different construction as compared to the main NVM and has a higher data transfer rate than the main NVM. While not limiting, in some embodiments the primary and front end controllers comprise programmable processors, the main NVM is a stack of one or more rotatable magnetic recording discs, and the secondary NVM is NAND flash memory.

The storage device is configured to operate in different processing modes. These modes are respectively referred to as a normal I/O mode and a front end I/O mode. During the normal I/O mode, the top level controller receives access commands from a host device and services the commands as required to transfer data between the host device and the storage device. For example, during the servicing of a write command to transfer input write data to the storage device, the top level controller will determine, based on various factors, whether to direct storage of the input write data to the primary NVM (e.g., discs) or the secondary NVM (e.g., flash). The data are thereafter directed to the appropriate memory location(s).

Similarly, during the servicing of a read command to return selected read data back to the host, the top level controller will determine a location of the requested read data and access the primary NVM, secondary NVM or some other memory location (e.g., read or write buffer, etc.) to return the data back to the host. It will be noted that during normal I/O mode, the data stored by the data storage device in the primary and secondary NVMs "belongs" to that storage device in the sense that the data was specifically directed to that storage device from a particular host. The top level controller of the storage device has primary responsibility for the contents and usage of the respective primary and secondary NVMs.

During the front end I/O mode, however, the secondary NVM of the storage device is controlled by the host device rather than the top level controller. Depending on the architecture of the storage device, commands issued by the host during front end I/O mode may still be initially processed by the top level controller, but the top level controller will forward the commands directly to the controller of the secondary NVM, which will proceed to operate the secondary NVM as a separate memory. This allows the host device to use the faster secondary memory for high priority tasks and data.

In some cases, multiple storage devices may be grouped together into an array to form a large memory space, such as in a multi-device enclosure used in a cloud processing environment. The host device can consolidate the secondary NVM from the storage devices to provide a consolidated, distributed front end memory space. During front end I/O processing, the secondary NVM of a first storage device may store data associated with a different, second storage device in the array.

Figure 2:
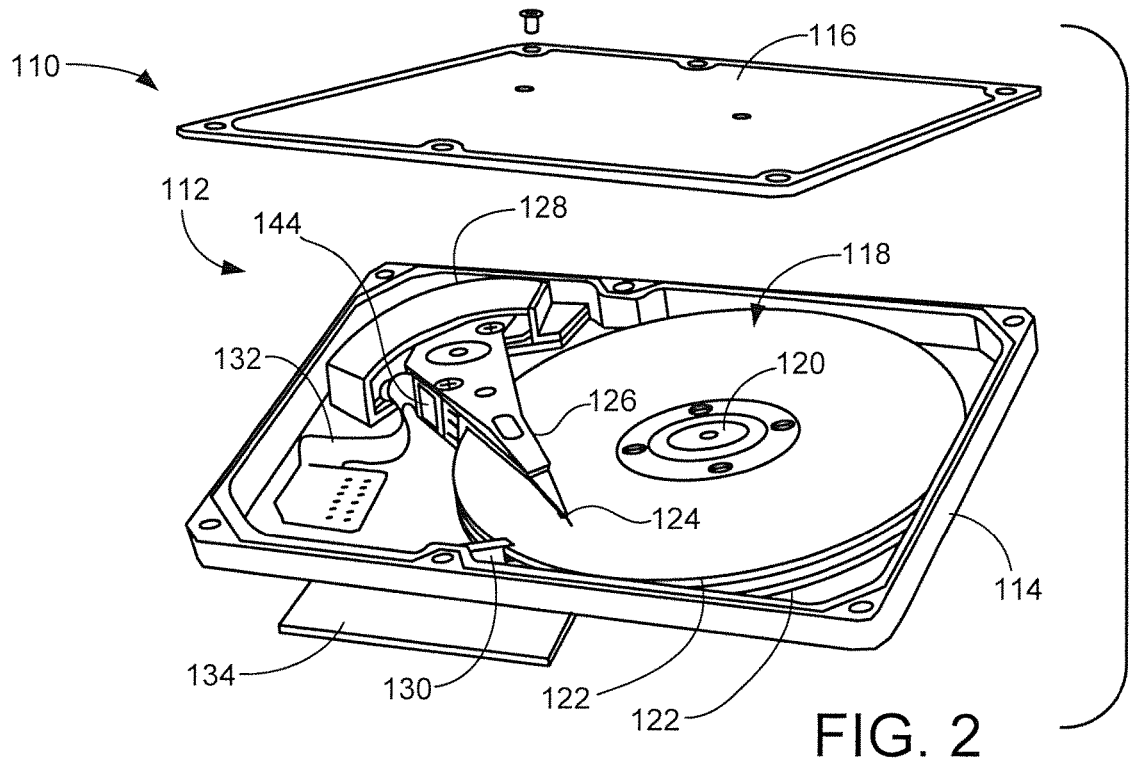
FIG. 2 is a line representation of the storage device of FIG. 1 in accordance with some embodiments.

FIG. 2 shows an example data storage device 110 that corresponds to the data storage device 100 in FIG. 1 in some embodiments. The device 110 is characterized as a hybrid data storage device that uses both HDD (disc) and SSD (flash) NVM to store and retrieve user data. Other forms of data storage devices may be used.

The hybrid device 110 has an environmentally sealed housing 112 formed from a base deck 114 and top cover 116. A disc stack 118 is disposed within the housing having a spindle motor 120 arranged to rotate a number of magnetic recording discs 122, in this case two, at a constant high speed. Data tracks defined on the various disc surfaces store data via an array of read/write data transducers (heads) 124. The heads 124 are supported by a rotary actuator 126 and are radially positioned using a voice coil motor (VCM) 128. A load/unload parking ramp structure 130 can be used to support the heads 124 away from the disc surfaces when the device 110 is transitioned to a deactivated state. Each combination ahead and data recording surface is referred to as a head/disc interface, or HDI.

Control and data signals are passed between the active elements of the actuator 126 and control electronics of the device using a flex circuit assembly 132. The flex circuit assembly passes the signals through the base deck 114 using a bulkhead connector to an external printed circuit board assembly (PCBA) 134. The PCBA 134 supports the control electronics and other external elements of the device. As a non-limiting example, the PCBA 134 may provide supplemental computing capabilities to the data storage device 110, such as additional processing, memory capacity, firmware, and/or software.

Figure 3:
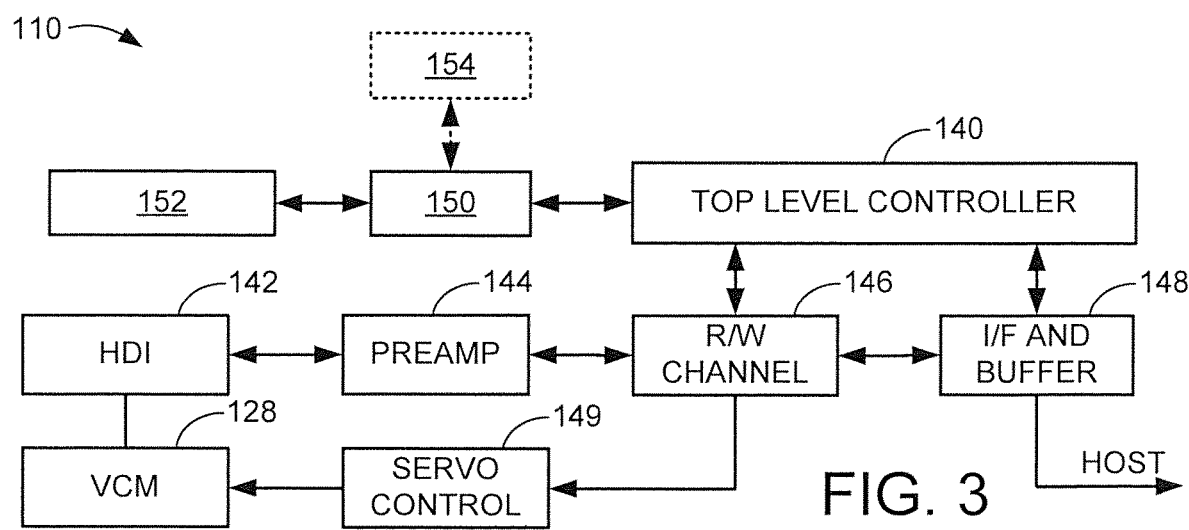
FIG. 3 displays a block representation of portions the storage device of FIG. 2 functionally arranged in accordance with assorted embodiments.

FIG. 3 provides a functional block representation of the hybrid device 110 of FIG. 2 in some embodiments. Other architectures may be used as desired. It will be recognized that many of the elements in FIG. 3 constitute the control electronics supported on the PCBA 134.

A top level controller 140 generally corresponds to the controller 102 in FIG. 1 and provides top level control functions for the device. In some embodiments, the top level controller includes one or more programmable processors, programmable logic circuits, and associated firmware incorporated into a system on chip (SOC) integrated circuit device. For reference, the top level controller 140 is also referred to as a first or primary controller, and the recordable discs 122 and heads 124 (e.g., collectively, the HDIs 142) are referred to as a first or primary NVM.

A data path is established between each HDI 142 and the host using a preamplifier/driver circuit (preamp) 144, a read/write (R/W) channel circuit 146 and an interface (I/F) and buffer circuit 148. The preamp 144 may be mounted to the side of the actuator 126 as shown in FIG. 2. The buffer portions of the circuit 148 may take various forms of volatile or non-volatile memory such as DRAM, SRAM, NOR flash, etc. to temporarily store data during data transfers. A servo control circuit 149 uses embedded servo information from the respective discs 122 to provide position control currents to the VCM 128 to position the heads 124.

A mobile controller 150 is coupled to the top level controller 140 to provide access control for a mobile memory 152, which may take the form of NAND flash memory and/or rotating magnetic discs. The mobile controller 150 may be a separate processor circuit in a different IC or may be incorporated into the main SOC of the top level controller 140. The mobile controller 150 is also referred to as a second or secondary controller, and the memory 152 is also referred to as a second or secondary NVM. It is contemplated that the mobile controller 150 can utilize one or more supplemental processors 154 selectively, as represented by segmented arrows. It is noted that the mobile controller 150 may be resident in the secondary NVM and communicate with a front end controller for some operations. For instance, a front end controller can be part of, or separate from, the top level controller 140 to utilize secondary NVM, via the mobile controller 150, for selected data storage device 110 operations.

The respective primary 140, mobile 150, and supplemental 154 controllers can concurrently, or sequentially, cooperate during normal I/O data transfer operations to service access (e.g., write and read) commands from the host device using, the primary and secondary NVMs 142, 152. A number of different arrangements can be used during such normal operation. In one approach, all input write data is initially written to the external memory 152, after which the data are cleaned (migrated) from NVM to discs 122. In another approach, some data sets are written to flash memory and other data sets are directed to the discs without passing through the flash.

Depending on the data integrity scheme employed by the device 110, all data written to the flash memory may be copied to disc to provide a backup copy, even if the data sets remain in the flash as well. In still other cases, certain hot data may be promoted (pinned) from disc to flash so that a copy of the data is moved to the flash for faster access. Suitable mapping structures are maintained in local memory (e.g., DRAM, etc.) to provide a map of the locations of the various data sets in the system.

It is contemplated that the flash memory 152 and the mobile controller 150 in FIG. 3 form a permanent portion of the hybrid device 110, so that these elements are incorporated into the external PCBA 134 shown in FIG. 2. However, in an alternative embodiment, the PCBA 134 is configured as shown in FIG. 4 to accept plug-in component, such as a card, chip, stick, or other portable assembly having a mechanism for establishing a physical and electrical connection to the top level controller 140, that can be added as required to supply the supplemental memory 152 and, as required, the processor 154 for the device 110.

Figure 4:
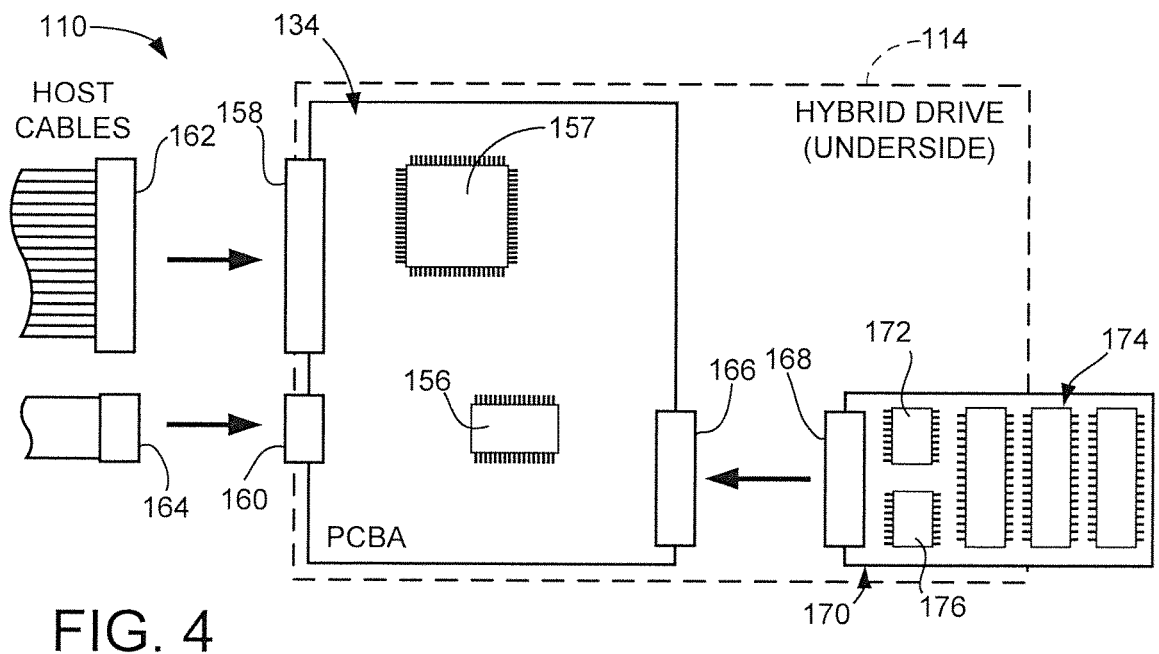
FIG. 4 shows portions of an example data storage device configured in accordance with some embodiments.

FIG. 4 is a bottom side line representation of the hybrid device 110 arranged in accordance with some embodiments. The outermost perimeter of the base deck 114 is represented in broken line fashion to illustrate how the hybrid device 110 can comprise more than what is explicitly shown in FIG. 4. The PCBA 134 is secured to the underside of the base deck 114 using suitable fasteners or other attachment mechanisms, although other attachment locations can be utilized. Exemplary control electronics are represented by ICs 156, 157 but it will be understood that the surfaces of the PCBA 134 may include many additional components that have been omitted for clarity of illustration.

The PCBA 134 includes first and second input connectors 158, 160. These connectors can take any suitable forms as desired to support various interconnect protocols including but not limited to SATA, SAS, SCSI. ATA, USB, PCIe, NVMe, Fibre Channel. Firewire, Ethernet, etc. While not limiting, it is contemplated that the first connector 158 provides a multi-pin SATA connection and the second connector 160 provides a serial bus connection. Mating cable assemblies 162, 164 from an upstream host are configured to mate with the PCBA connectors 158, 160. Other attachment configurations can be used, such as by plugging the PCBA into a dongle, a midplane board, etc. Wireless interfaces are also contemplated.

The PCBA connectors 158, 160 can be partially, or completely, internal, or external, to the housing 112 to position edge connectors along a perimeter edge of the base deck 114 to facilitate easy connection with the connectors 162, 164. The PCBA 134 further includes a front end bus 166 configured to removably mate with a corresponding connector 168 of an external computing component 170. As before, any number of suitable interconnection arrangements can be used as desired. The bus 166 can be characterized as a front end connector due to the ability to cooperate with other control components, such as ICs 154/156, of the device 110 to manage front end operation of the device. For example, the front end bus 166 can recognize connection of a portable component 170, such as a card, chip, stick, or computing device, employing any type of memory and utilize that memory to optimize front end operation of the device 110 while the rotating data storage media of the disc stack 118 maintains long-term data storage functions.

Although not required, various embodiments position the front end bus 166 to be exposed to an exterior of the base deck 114 while the disc stack 118 is wholly contained within an internal cavity within the housing 112. That is, the front end buss 166 can be exposed to the exterior of the housing 112 so that an attached component 170 can be separated from the internal cavity of the housing 112 while being physically and electrically connected to the front end bus 166.

The computing component 170 plugs into the PCBA 134 to add various features such as the flash controller 150, supplemental processor 154, and additional memory 152 from FIG. 3, as generally depicted by ICs 172, 174, 176. Any number of different types of memory cards can be used as a computing component 170, including standardized memory cards (e.g., MemoryStick, SD cards, USB flash drives, etc.). The ability to selectively plug in, and remove, portable computing components 170 provides flexibility to supplement the computing capabilities of the device 110, such as failed or worn out memory, insufficient processing power, or too large a power draw during operation, can be easily replaced or supplemented without physically replacing hardware of the PCBA 134 or within the housing 112.

In some cases, the mobile controller 150 is incorporated into the main PCBA 134, allowing memory modules 174 with flash memory to be coupled via the connectors 166, 168. The PCBA 134 may also incorporate a first amount of flash memory, allowing the portable computing component 170 to provide an additional, second amount of flash memory to upgrade the capacity of the device 110. Other attachment locations and configurations can be used for the portable computing component 170, but it is contemplated that, when installed, the component 170 will be recessed within the overall footprint of the storage device (e.g., boundary 114). In some embodiments, the firmware executed by the top level controller 140 can be configured to detect the presence or absence of the portable computing component 170, and operate accordingly.

Figure 5:
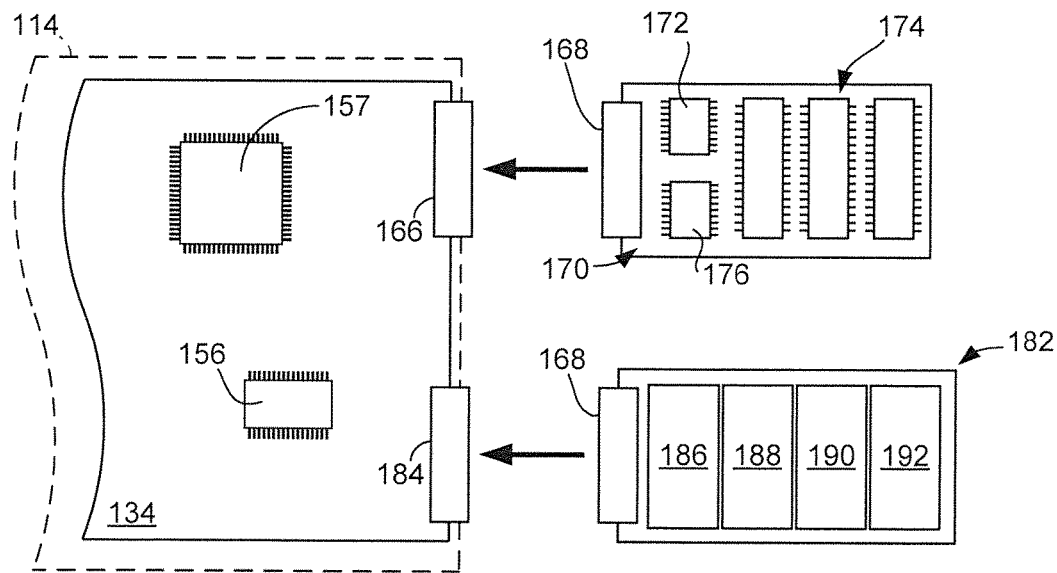
FIG. 5 illustrates portions of an example data storage device arranged in accordance with various embodiments.

It is contemplated that the PCBA 134 can be concurrently attached to multiple separate portable computing components 170. FIG. 5 depicts a line representation of portions of an example data storage device 180 configured in accordance with some embodiments to utilize multiple computing components 170 and 182. With the physical insertion of a first computing component 170 into a first front end bus 166 of the PCBA 134, the top level controller 140 of the device recognizes the computing capabilities of the first computing component 170 and automatically alters device 180 operation to utilize some, or all, of the component 170 to optimize at least data storage performance.

At any time, a second computing component 182 can be physically attached, and electrically connected to, a second front end bus 184. It is noted that either computing component 170/182 can be individually utilized in either front end bus 166/184. The connection of multiple computing components 170/182 prompts the top level controller 140 to assess the additional computing capabilities provided by the constituent hardware of the components 170/182.

Although not limiting or required, the second computing component 182 can provide processing capabilities without having a volatile, or non-volatile, memory. Such processing capabilities can correspond with one or more local controllers 186 that direct operations from at least one supplemental processor 188 and security module 190. A local power source 192, such as a battery or capacitor, may also be incorporated into a portable computing component 182 to provide electrical power despite being electrically disconnected from a front end bus 184. The utilization of a computing component 182 that provides processing and/or security capabilities without local data storage memory can be physically contained in a smaller package than if memory was incorporated, all while complementing the data storage capabilities of other components 170 and the internal memory, such as disc stack 118.

It is contemplated that more than two separate computing components 170/182 are concurrently connected to the PCBA 134. For instance, multiple separate components with matching hardware or matching computing capabilities may be concurrently utilized. In other non-limiting examples, multiple computing components can be physically and electrically connected to the PCBA 134 that provide different hardware and dissimilar computing capabilities. The ability for a user to selectively insert, and remove, any number of computing components 170/182 of any type and size provide supplemental capabilities to the device 180 and the data storage system in which the device 180 is incorporated that can prevent, or at least delay, the need to replace the device 180. That is, the intelligent identification and utilization of attached computing components 170/182 by the top level controller 140 allows the device 180 to employ upgraded computing capabilities without having to replace the device 180 itself, which allows the device 180 to utilize the latest software, firmware, and hardware technology without replacing any original components of the device 180.

Figure 6:
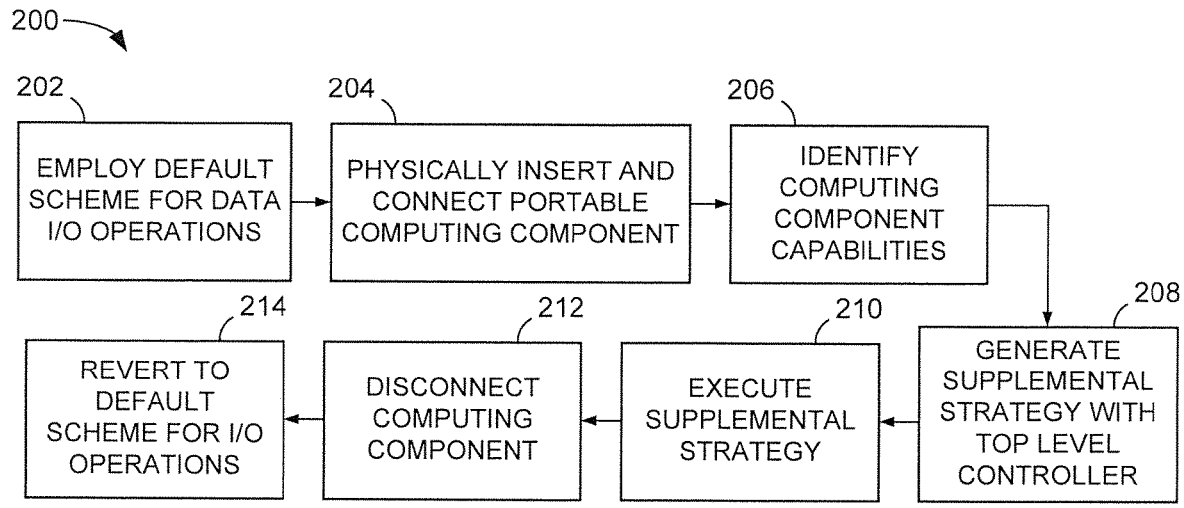
FIG. 6 conveys a timeline of operations conducted by an example data storage device in accordance with assorted embodiments.

FIG. 6 is an example timeline 200 of operations for a data storage device employing the various embodiments of FIGS. 1-5. A data storage device can be employed in any type, and size, of data storage system, such as a personal computer, cloud computing node, or data enclosure of a data storage rack. It is noted that the data storage device can have an internal memory and top level controller are employed to execute a data accesses, such as data input and output (I/O), according to a default scheme in step 202. Such default scheme can consist of various data processing, such as metadata generation, striping, and/or mirroring, as well as data security, such as data translation, key generation, key verification, and host verification, as directed by the firmware initially stored in the data storage device. While firmware can be updated over time, a default scheme in step 202 is meant as a data processing and security operations stored in local memory and conducted by a top level controller of the data storage device.

At some time after step 202, at least one portable computing component is physically inserted into a bus of the data storage device in step 204 to electrically connect the computing component to the top level controller of the device. It is contemplated that the computing component may optionally be inserted in step 202 without taking the data storage device offline, disconnecting the data storage device, or disassembling any portion of the data storage device. Such activity is possible by having the component bus, and attached computing component, to be partially, or wholly, external to the housing of the data storage device.

Connection of an external computing component triggers the top level controller to identify the capabilities of the component in step 206. The identification of step 206 can take place automatically with the top level controller and without specific activation from a host. As such, the top level controller can conduct step 206 at any convenient time after the component is electrically connected. For instance, the top level controller can delay testing, polling, or otherwise activating portions of the attached computing component until data storage activity, or other data storage device operation, is completed. Once the top level controller does communicate with the attached computing component, any number of operations can be conducted for any amount of time to determine the scope, performance, and reliability of the constituent hardware, software, and firmware resident in the attached computing component. It is contemplated that portions of the firmware and/or software from the attached computing component are downloaded to the data storage device. However, the top level controller may utilize firmware and software from the attached computing component without moving anything into the data storage device.

The identification of the computing capabilities of the attached computing component allows the top level controller to generate a supplementation strategy in step 208. The supplementation strategy sets forth a manner of utilizing some, or all, of the computing capabilities of the attached computing component. For example, a supplementation strategy may assign certain tasks, such as data security or data operations of a chosen size, to the hardware of the attached computing component. As another non-limiting example, a supplementation strategy can conduct data access operations first with the hardware of the attached computing component before utilizing hardware of the data storage device. The ability to selectively utilize portions of the attached computing component allows the top level controller to optimize data storage operation for a variety of different operating parameters, such as data volume, data security, and pending data access operations, via the prescribed hardware utilization schedule of the supplementation strategy.

The generated supplementation strategy is carried out in step 210 over time. Step 210 may additionally involve altering the supplementation strategy in response to encountered conditions. For instance, connection of additional computing components, connection of additional data storage devices, error rate, or data transfer size can trigger the top level controller to change the supplementation strategy by either returning to step 206 to completely replace the previous strategy or modify a portion of the strategy in view of changing operational conditions experienced during step 210.

At some time after the execution of at least some of the supplementation strategy, step 212 detects that a computing component has been electronically disconnected from the data storage device. Such removal of the computing capabilities of the component is recognized by the top level controller in step 214, which prompts the controller to revert to the default scheme employed in step 202 for data storage device operation and data accesses. In some embodiments, step 214 retains selected capabilities from the computing component, such as downloaded firmware, but such retention is not required and the top level controller may delete, or ignore, any downloaded firmware or software in step 214.

Figure 7:
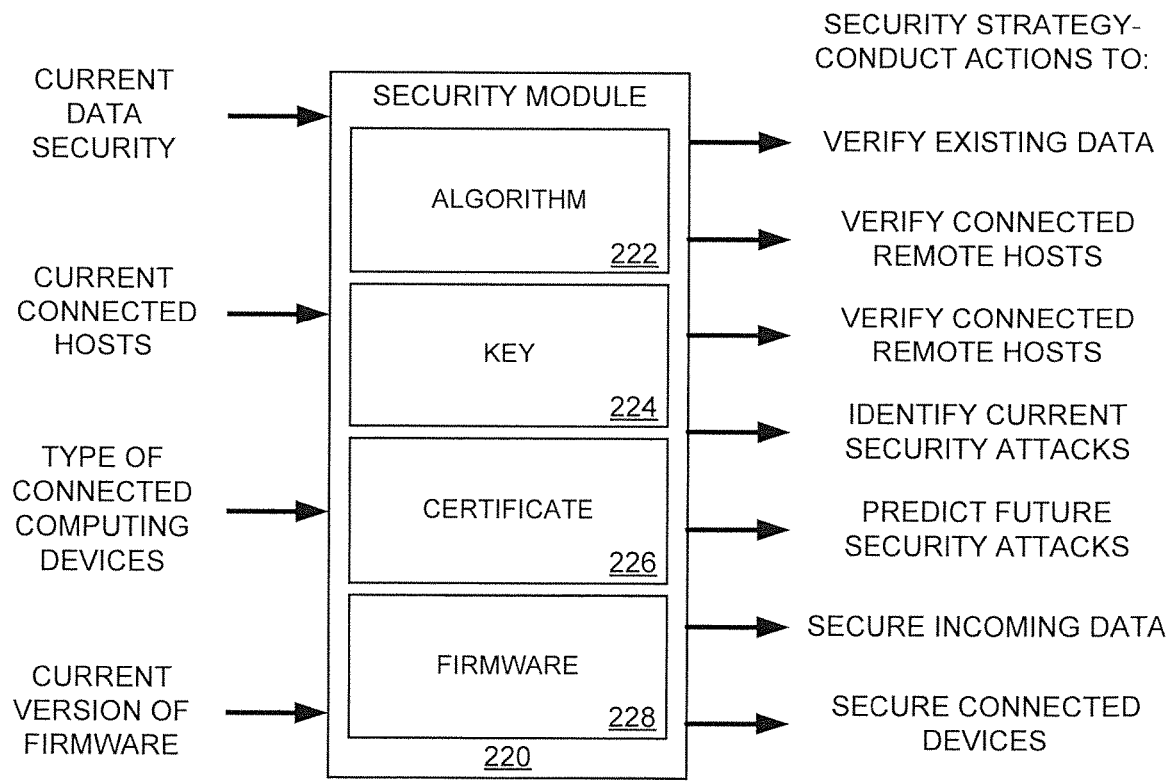
FIG. 7 depicts a block representation of an example security module utilized in a data storage system in some embodiments.

During utilization of an attached computing component, it is contemplated that data security for at least the data storage device is controlled by a security module of the component. FIG. 7 conveys a block representation of an example security module 220 resident in an attached computing component that can be utilized by a top level controller in accordance with some embodiments. The security module 220 can be resident in memory or a processor of a computing component to provide any number of algorithms 222, keys 224, certificates 226, and firmware 228 to allow data, data storage devices, and hosts to be verified and secured. The security module 220, in some embodiments, is initialized once being physically and electrically mated to a specific host or data device, such as via a key or other trusted protection module.

The security module 220 can utilize a controller/processor of the attached computing component or the top level controller of a data storage device to generate a security strategy by assessing at least the current data security parameters, current number of connected hosts, current type of connected computing devices, and current version of operating firmware. The security strategy generated by the security module 220 then outputs one or more alterations to data storage operations to increase data, and host, security.

An example security strategy generated by a top level controller and/or component processor can prescribe actions to verify existing data stored in a data storage device or computing component, secure incoming data from remote hosts, secure other data storage devices of the data storage system, verify connected hosts, identify current security attacks, and predict future security attacks. It is contemplated that the security module 220 conducts any number, and type, of data access operations, such as data reads, data writes, test pattern deployment, and redundant operations, in accordance with the security strategy to arrive at the verification and securement of data, devices, and hosts connected to the computing component.

Figure 8:
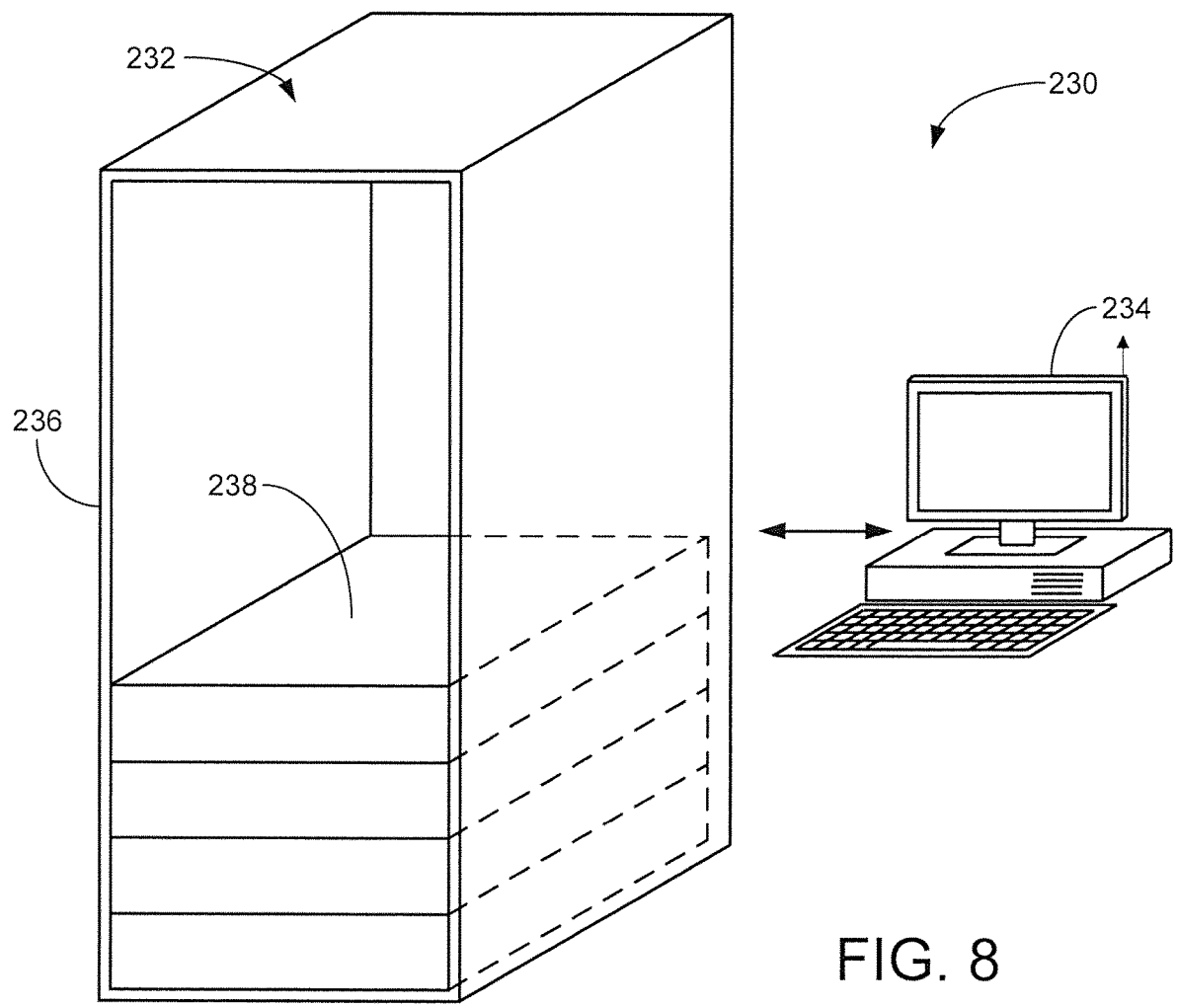
FIG. 8 displays a multi-data storage device computing system in accordance with further embodiments.

FIG. 8 shows a data storage system 230 in which various embodiments of the present disclosure may be advantageously practiced. The data storage system 230 is a mass-data storage system in which a large population of data storage devices such as 110 are incorporated into a larger data storage space to provide a storage node as part of a larger geographically distributed network. Examples include a cloud computing environment, a network attached storage (NAS) application, a RAID (redundant array of independent discs) storage server, etc.

The system includes a storage assembly 232 and a computer 234 (e.g., server controller, etc.). The storage assembly 232 may include one or more server cabinets (racks) 236 with a plurality of modular storage enclosures 238. While not limiting, the storage rack 236 is a 42U server cabinet with 42 units (U) of storage, with each unit extending about 1.75 inches (in) of height. The width and length dimensions of the cabinet can vary but common values may be on the order of about 24 in.×36 in. Each storage enclosure 238 can have a height that is a multiple of the storage units, such as 2U (3.5 in.), 3U (5.25 in.), etc. to accommodate a desired number of adjacent storage devices 100.

Figure 9:
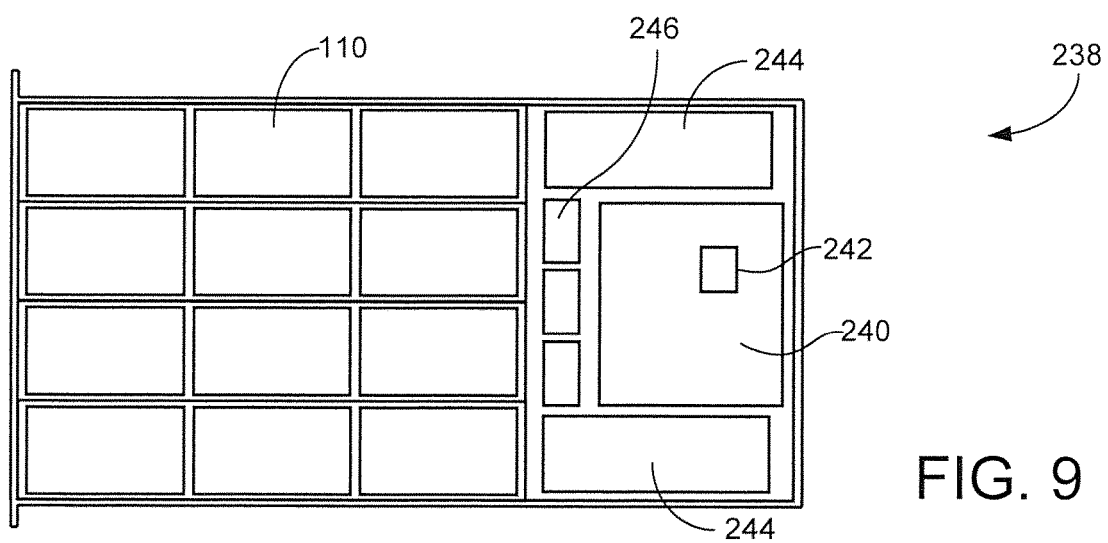
FIG. 9 shows a storage enclosure of the system of FIG. 8 that incorporates a number of data storage devices configured in accordance with various embodiments.

FIG. 9 is a top plan view of a selected storage enclosure 238 that incorporates 36 (3×4×3) of the data storage devices 110. Other numbers and arrangements of data storage devices 110 can be incorporated into each enclosure. The storage enclosure 238 includes a number of active elements to support the operation of the various storage devices, such as a controller circuit board 240 with one or more processors 242, power supplies 244 and cooling fans 246.

The modular nature of the various storage enclosures 238 is provided to permit removal and installation of each storage enclosure into the storage rack 236 including under conditions where the storage devices 100 in the remaining storage enclosures within the rack are maintained in an operational condition. In some cases, the storage enclosures may further be configured with access panels or other features along the outwardly facing surfaces to permit individual storage devices, or groups of devices, to be removed and replaced. Sliding trays, removable carriers and other mechanisms can be utilized to allow authorized agents to access the interior of the storage enclosures as required.

From this it can be seen that storage devices 110 in a given storage enclosure 238, or across multiple enclosures, can be controlled by one or more local host devices (e.g., the processors 242) to consolidate the flash memory (or other NVM) across multiple devices. This provides an on-demand SSD performance feature without the need or expense of mounting both SSDs and HDDs into the various enclosures.

Figure 10:
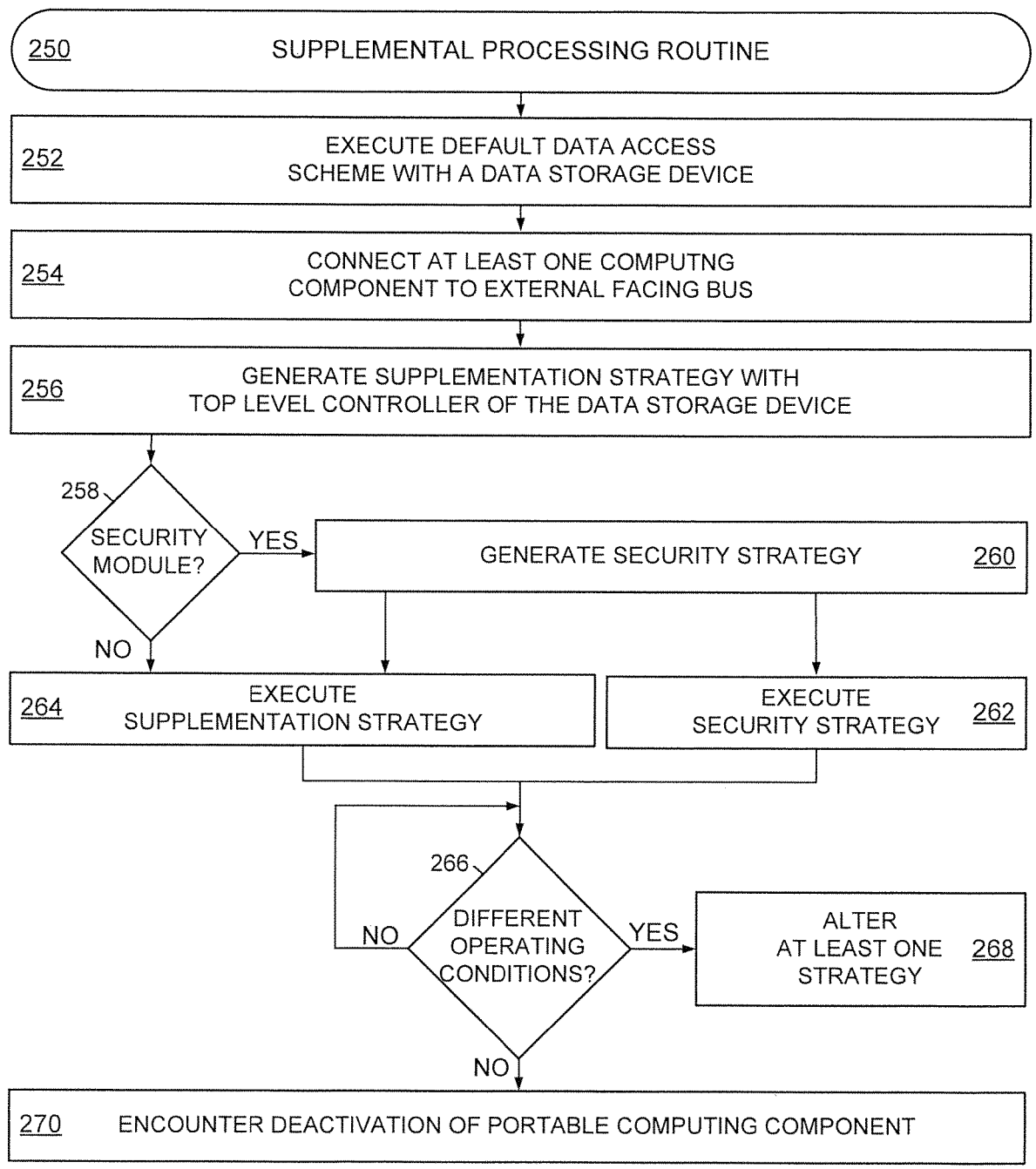
FIG. 10 is a flowchart of an example supplemental processing routine that can be executed with the assorted embodiments of FIGS. 1-9.

In FIG. 10, an example supplemental processing routine 250 is shown. The routine 250 can be carried out as part of a data storage system that comprises any number of data storage devices connected to any number of host as part of a distributed data storage network. Data accesses, such as data writes and data reads, can be conducted with at least one data storage device according to a default access scheme in step 252 that involves the top level controller of the device conducting at least security and data maintenance, such as metadata generation, metadata storage, garbage collection, and read refresh. Any number of data accesses, and data maintenance operations, can be conducted over time by repeating step 252.

At some time, at least one portable computing component is physically and electrically connected to a data storage device in step 254. In some embodiments, step 254 involves inserting a printed circuit board into an externally accessed bus of a data storage device with the circuit board comprising at least a processor. It is contemplated that more than one portable computing component can be inserted into a single data storage device, or into multiple separate devices of a data storage system with the computing components having matching, or dissimilar, hardware configurations and computing capabilities. The connection of the computing component(s) in step 254 prompts at least one top level controller to generate a supplementation strategy in step 256 where the resources of the attached computing components are identified and implemented into data storage operations with the top level controller of the attached data storage device.

The supplementation strategy of step 256 can prescribe wholly, or partially, supplementing processing operations from the top level controller to the processor(s) of the attached computing component(s). It is contemplated that the supplementation strategy generated in step 256 assigns some, but not all, data access and/or maintenance operations to the attached processors of the computing components of the data storage system. As such, an attached computing component can be utilized, in some embodiments, by a top level controller for data access operations in a first data storage device despite being physically attached to a different, second data storage device of the distributed data storage system. However, other embodiments require a processor, and/or security module, to be physically attached to the data storage device to be available for data access and maintenance operations for that data storage device.

With the supplementation strategy at least partially developed by a top level controller of the data storage device attached to the portable computing component, decision 258 evaluates if the attached computing component comprises a security module, such as module 220 of FIG. 7. If so, the top level controller also generates a security strategy in step 260 that incorporates the security module into at least some data, and device, encryption, decryption, and validation operations during strategy execution in step 262. As such, data can be encrypted and stored on solid-state or rotating data storage means with security information generated by the supplemental strategy. It is contemplated that multiple computing components can concurrently be connected to one or more host devices to allow redundancy and protect against a single device resulting in the loss of a security key.

At the conclusion of step 260, or if an attached computing component does not comprise a security module from decision 258, step 264 executes some, or all, of the supplementation strategy generated in step 256. It is noted that portions of the supplementation strategy can be executed at any time during decision 258 and steps 260 and 262, but the supplementation strategy can be wholly in play in step 264. Various data access, and maintenance, operations can be conducted with concurrent execution of developed security and supplementation strategies over time, without limitation. During such operations, decision 266 can continuously, sporadically, or routinely monitor operating conditions for changes that can materially alter the efficiency, and/or reliability, of the supplementation or security strategies. The use of multiple computing components can increase security by utilizing multiple level security checkpoints One or more different operating conditions beyond a predetermined threshold triggers step 268 to revisit the respective supplementation and security strategies and make alterations in view of the changed operating condition(s). The strategy alteration of step 268 may be a complete regeneration of the supplementation, and/or security, strategy or a change to less than all of the strategy generated in steps 256 and/or 260. In this way, the supplementation and security strategies are consistently optimized to real-time device, and system, operating conditions.

At the conclusion of step 268 with at least one altered strategy, or in the event no material changes in operating conditions is discovered in decision 266, step 270 encounters the electrical deactivation of at least one computing component. Such deactivation may be the physical removal of the component and/or an electrical deactivation while the component physically remains attached to the data storage device. The deactivation of a computing component causes routine to revert to step 252 where the default data access scheme is employed. However, it is contemplated that portions of the previously attached computing component, such as downloaded firmware or security protocol, can be retained by the data storage device and utilized by the top level controller after step 270.

It is noted that electrically disconnecting a computing component would stop access to data and moving a computing component to a different data storage device would prompt generation of a new security key with the security module. Hence, computing components could not be swapped between connected devices to gain access to data due to the components being keyed to the particular storage device family.

Through various embodiments of a data storage system, one or more portable computing components can be physically and electrically connected to a data storage device to make the device, and data stored therein, secure. An attached computing component can provide at least one supplemental processor that ties into the trusted protection module (TPM) of the data storage device to allow each device of a distributed data storage system to be secure. For instance, an attached computing component can be a physical key that operates with a digital password to enable data accesses to any data storage device of a data storage system.

The ability to add intelligence and security to a data storage device, and the connected devices of a distributed system, provides system modularity with minimal availability disruption. That is, additional processing, security, and data storage capacity can be added to a data storage system and intelligently incorporated into data storage operations via attachment of a computing component without deactivating, reformatting, or otherwise taking a data storage device offline. By connecting one or more computing components, a data storage device can be configured with additional processing, additional security, and additional storage capacity.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising a first controller connected to a first bus, the first bus accessible from a position external to a housing where the first controller is resident, a first computing component electrically connected to the first bus and positioned external to the housing, the first computing component comprising a second controller, the first controller configured to generate a supplementation strategy in response to connection of the first computing component with the first bus, the supplementation strategy assigning at least one processing task from the first controller to the second controller while the first computing component is attached to the first bus.

2. The apparatus of claim 1, wherein the first controller is connected to a second computing component via a second bus, the second computing component positioned external to the housing.

3. The apparatus of claim 2, wherein the second computing component has different computing capabilities than the first computing component.

4. The apparatus of claim 2, wherein the second computing component is assigned at least one processing task from the first controller as part of the supplementation strategy.

5. The apparatus of claim 2, wherein the second computing component comprises a third controller and a supplemental processor.

6. The apparatus of claim 1, wherein the first controller is positioned within the housing, the housing being sealed.

7. A method comprising:
  connecting a first controller to a second controller via a first bus, the bus exposed to an exterior surface of a housing, the second controller positioned on a portable computing component connected to the bus, the portable computing component positioned external to the housing;
  identifying computing capabilities of the portable computing component with the first controller;
  generating a supplementation strategy with the first controller in response to connection of the portable computing component to the bus; and
  executing the supplementation strategy by assigning at least one processing task from the first controller to the second controller.

8. The method of claim 7, wherein the assigned at least one processing task directs data access operations to a memory resident in the housing.

9. The method of claim 7, wherein the portable computing component is a stand-alone computer comprising a portable memory and power source.

10. The method of claim 7, wherein the supplementation strategy utilizes the second controller instead of the first controller.

11. The method of claim 7, wherein the supplementation strategy concurrently utilizes the first and second controllers to conduct data storage operations.

12. The method of claim 7, wherein the first controller alters the supplementation strategy in response to detected operating conditions of the portable computing component.

13. A method comprising:
  connecting a first controller to a second controller via a first bus, the bus exposed to an exterior surface of a housing, the second controller positioned on a portable computing component connected to the bus, the portable computing component positioned external to the housing;
  identifying computing capabilities of the portable computing component with the first controller;
  generating a supplementation strategy with the first controller in response to connection of the portable computing component to the bus;
  generating a security strategy with the first controller in response to the portable computing component having a security module;
  executing the security strategy with the second controller and security module to secure data stored in memory resident in the housing; and
  executing the supplementation strategy by assigning at least one processing task from the first controller to the second controller.

14. The method of claim 13, wherein the security strategy comprises at least one action to secure data stored in a remote data storage device connected to the first controller via a network.

15. The method of claim 13, wherein the security strategy utilizes the security module to provide a certificate.

16. The method of claim 13, wherein the security strategy utilizes the security module to provide an encryption key.

17. The method of claim 13, wherein the security strategy comprises at least one action to identify a third-party attack.

18. The method of claim 13, wherein the security strategy comprises at least one action to predict a future third-party attack.

19. The method of claim 13, wherein the security strategy comprises at least one action to verify a host connected to the first controller.

* * * * *